United States Patent [19]

Delbrouck et al.

[11] 4,095,720
[45] Jun. 20, 1978

[54] PLASTIC CARRIER FOR FLUID CONTAINERS

[75] Inventors: Franz Delbrouck, Bergisch-Gladbach; Wilfried Nickel, Menden, both of Germany

[73] Assignee: Freya-Plastic Franz Delbrouck GmbH, Menden, Germany

[21] Appl. No.: 719,058

[22] Filed: Aug. 30, 1976

[30] Foreign Application Priority Data

Sep. 3, 1975 Germany ............................ 2539127

[51] Int. Cl.² ....................... B65D 21/02; B65D 1/24; B65D 1/38; B65D 25/04
[52] U.S. Cl. .................................... 220/21; 206/203; 206/427; 206/518; 206/519
[58] Field of Search ......................... 220/21, DIG. 15; 206/201, 203, 427, 515, 518, 507, 519, 520

[56] References Cited

U.S. PATENT DOCUMENTS

| | | | |
|---|---|---|---|
| 2,411,673 | 11/1946 | Vechey | 220/DIG. 15 |
| 3,333,727 | 8/1967 | Belcher | 220/21 |
| 3,421,649 | 1/1969 | Waller | 220/21 |
| 3,481,507 | 12/1969 | Sanders | 206/507 |
| 3,568,879 | 3/1971 | Box | 220/23.6 |
| 3,828,927 | 8/1974 | Schoeller | 220/23.6 |

FOREIGN PATENT DOCUMENTS 758,517  10/1956  United Kingdom ........ 220/DIG. 15

*Primary Examiner*—George E. Lowrance
*Attorney, Agent, or Firm*—Spencer & Kaye

[57] ABSTRACT

A carrier for containers, such as bottles, the carrier being made of plastic, being nestable with identical carriers when empty and being formed to be stacked, when filled, with other filled carriers in a manner such that the weight load of the stack is supported by the bottles, the carrier including a grid-like bottom, a top frame, columns connecting the bottom to the top frame and stacking projections extending downwardly from the bottom and having parts which project laterally outwardly from the bottom while being laterally inset from the outer edge of the rim.

7 Claims, 4 Drawing Figures

PLASTIC CARRIER FOR FLUID CONTAINERS

BACKGROUND OF THE INVENTION

The present invention relates to a stackable carrier for fluid containers such as bottles or the like, the carrier being made of plastic and being of a type having a grid-like crate bottom, upwardly extending columns which extend from the bottom and merge into a top frame, and stacking projections which extend downwardly from the bottom of the carrier. The fluid containers stand upright in compartments formed in the carrier and are supported on the bottom of the carrier. The carrier is dimensioned to have an overall height greater than that of the containers which it is to carry.

In known carriers of this type, the bottom of the carrier is of the same size as the top frame, and the stacking projections are set inwardly from the bottom edge, so that in order to provide a positive fit when the carriers are stacked, the stacking projections of one stacked carrier can be inserted into the top of the underlying carrier.

As a result of this, the carriers require considerable storage and transport space, even when they are empty. Moreover, conventional carriers require a relatively large amount of material and are relatively expensive.

SUMMARY OF THE INVENTION

It is, therefore, an object of the present invention to provide a carrier of the above-described type which requires less storage and transport space.

It is another object of the invention to provide a carrier which can be fabricated with a minimum amount of material without adversely affecting the stability of a stack of filled carriers.

These and other objects are achieved according to the invention by providing a carrier of the above-mentioned type in which there is a respective stacking projection associated with each compartment; each stacking projection includes a part which projects laterally beyond the bottom; each stacking projection is dimensioned and positioned for causing the minimum distance between each projection and a vertical plane passing through the outer edge of the top frame to be at least equal to the thickness of the frame, and for causing the minimum distance between each adjacent pair of stacking projections to be at least twice that predetermined thickness; at least some of the columns are located between the laterally projecting parts of respective adjacent pairs of stacking projections; and the interior of the carrier is divided into compartments by hollow dome-shaped members located to define compartment boundaries, which members extend upwardly from the bottom, are upwardly tapered, and have a constant wall thickness along their entire length.

If the carriers are used for fluid containers, which will hereinafter be referred to as bottles, made for example of glass or plastic, it is advantageous, according to the present invention, to make the inside height of the carrier equal to or less than the height of the bottles to be carried, so that the bottles in one carrier can carry all or at least part of the weight of the carrier thereabove.

In this way, there is obtained a carrier such that when a plurality of such carriers are empty, they can be nested one within the other, thus reducing the amount of storage and transport space required, as compared to conventional carriers. Moreover, when the carriers are filled with bottles, they are stackable to be interconnected in a form-fitting manner, the arrangement being such that carriers at one level are staggered with respect to carriers at the next level, with adjoining top frame arms of two horizontally adjacent carriers on one level being located between two adjacent stacking projections of a carrier at the next higher level. In this way, the carriers on one level cannot be horizontally displaced with respect to the carriers at the next level.

Moreover, the present invention enables carriers to be made lighter, and thus with less material and at lower cost, than is possible with heretofore known carriers. This is so because the bottles themselves take over the function of supporting at least a part of the load. Nonetheless, the bottles are enclosed over their entire lengths.

By making the stacking projections in the form of ring-shaped, closed ribs, the inherent or natural stability of the carrier is increased.

According to another feature of the present invention, corner columns are provided which extend upwardly from the laterally projecting regions of the stacking projections and which connect with the top frame. This results in a high natural stability without significantly increasing the amount of material which is utilized. Moreover, the corner columns serve to provide a good enclosure for the bottles located in the corner compartments.

According to another feature of the invention, the columns have a cross section in the form of troughs which open toward the center of the carrier, thus providing a robust configuration requiring but little material.

For still further increasing the rigidity and stability of a stack of filled carriers, each stacking projection can be provided with a curved bottle guide having a radius of curvature coaxial with the vertical central axis of its associated compartment.

By forming the carrier according to the invention to have conical side elements and appropriately selected cutouts in its side walls, its bottom and the cross stacking elements carried thereby, which elements have a length and width greater than the length and width of the conical carrier below, measured at the inside of the bottom of the carrier, it becomes possible for carriers of the same size, when empty, to be nested within each other.

The width of the top frame 4 of a carrier in any direction is so that the bottom 1 of another identical carrier can be inserted. Once inserted the second carrier can be fitted into the first carrier until the outside width in diagonal direction of the inserted second carrier is equal to the inside width of the first carrier in diagonal direction. This position is reached when the second carrier has been fitted in for about 90 percent of its height.

The conical dome-shaped members of the carrier, which can likewise be nested when the carriers are empty, have cutouts that are shaped to conform to the configuration of the bottles, and serve to form separate receiving compartments for the individual bottles, so that the same cannot strike against one another.

As a result, each bottle will, depending on its diameter, have a supporting surface of the same diameter, which protects the bottle with respect to pushing and striking forces from below despite the fact that the inner dimension, in length and width, at the bottom of the carrier, is less than the outer dimension of the bottles, measured in the same directions. This produces a stackable carrier which, when empty, can be nested with similarly configured carriers, it being possible to make such a carrier with a surprisingly small amount of material as compared to heretofore known carriers. In other words, the amount of material is so small that an empty carrier, i.e, a carrier without bottles, cannot support the weight of a carrier filled with bottles. On the other hand, sufficient material is used to allow a carrier which is filled with bottles to be readily handled.

DESCRIPTION OF THE PREFERRED EMBODIMENTS

Figure 1:
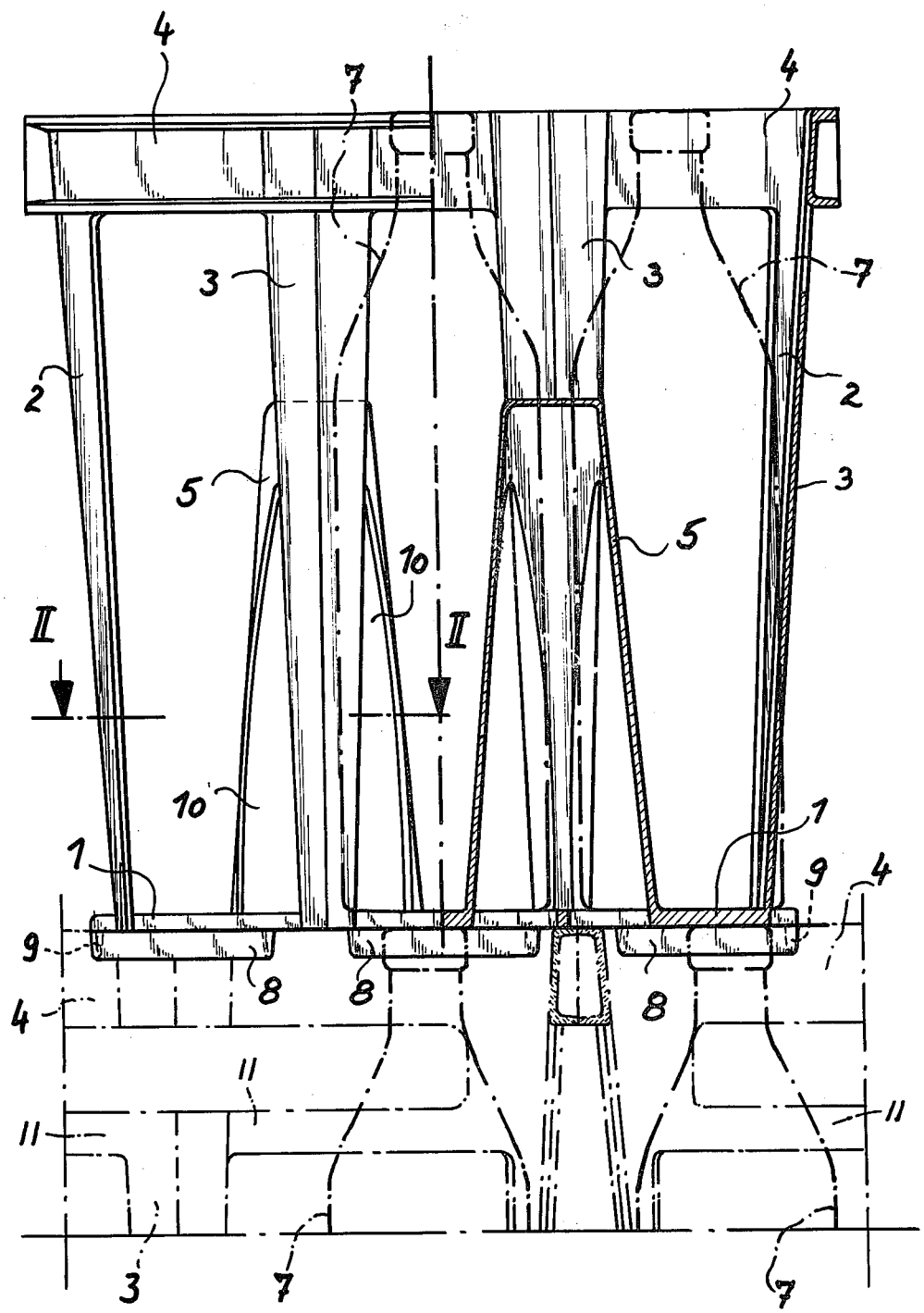
FIG. 1 is a front elevational view of a preferred embodiment of a bottle carrier according to the present invention, shown partly in section along line I—I of FIG. 2.

Referring to the drawings as a group, the same show a bottle carrier according to the present invention, constituted by a one-piece unit made of plastic by a conventional injection molding process. Any suitable know moldable plastic having suitable strength and rigidity can be employed.

Each carrier includes a grid-like bottom 1, four upright corner columns 2 arranged at the corners, six additional side columns 3, and a connecting top frame 4. Frame 4 is composed of two parallel long arms and two parallel short arms joined together to form a rectangle. Extending upwardly from the bottom 1 are two upwardly tapering domes 5, which have a constant wall thickness throughout their entire lengths and which divide the interior of the carrier into six compartments 6 each capable of receiving a bottle 7, the compartments all being of substantially the same size.

Each compartment 6 has associated with it a stacking projection 8 which extends from the underside of the bottom. Each of the stacking projections is in the form of a closed, ring-shaped rib, and each has a region 9 which projects laterally, i.e., horizontally, outwardly from the bottom 1 defined by the straight, intersecting bottom ribs. As can be seen in FIGS. 1-4, each region 9 is horizontally spaced from a vertical plane passing through the outer edge of the frame 4 by a minimum distance approximately equal to the horizontal width, or thickness, $t_4$ of the arms of the connecting frame 4, and the minimum distance $d_8$ between adjacent stacking projections 8 shown in FIG. 3, is slightly greater than twice the width $t_4$ of an arm of the connecting frame 4, so that, as shown in dot-dash lines in FIG. 1, adjoining arms of two horizontally adjacent carriers located below a given carrier can be received between two adjacent stacking projections of the given carrier, there resulting a positive fit which prevents any significant lateral displacement of the carriers with respect to each other.

Each carrier is given an interior height, measured vertically from the upper surface of bottom 1 to the upper surface of top frame 4, slightly less than the height of each bottle 7 which the carrier is designed to hold. This will enable the weight load of the stack to be supported by the bottles themselves.

Figure 2:
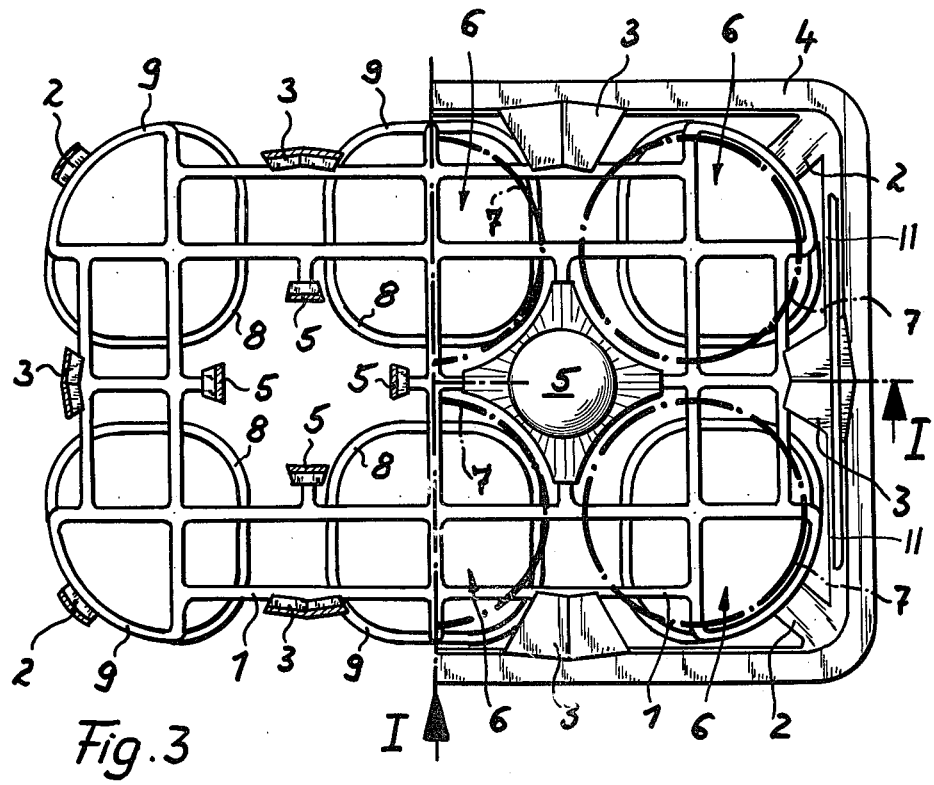
FIG. 2 is a top plan view of the same carrier shown partly in section along line II—II of FIG. 1.
Figure 3:
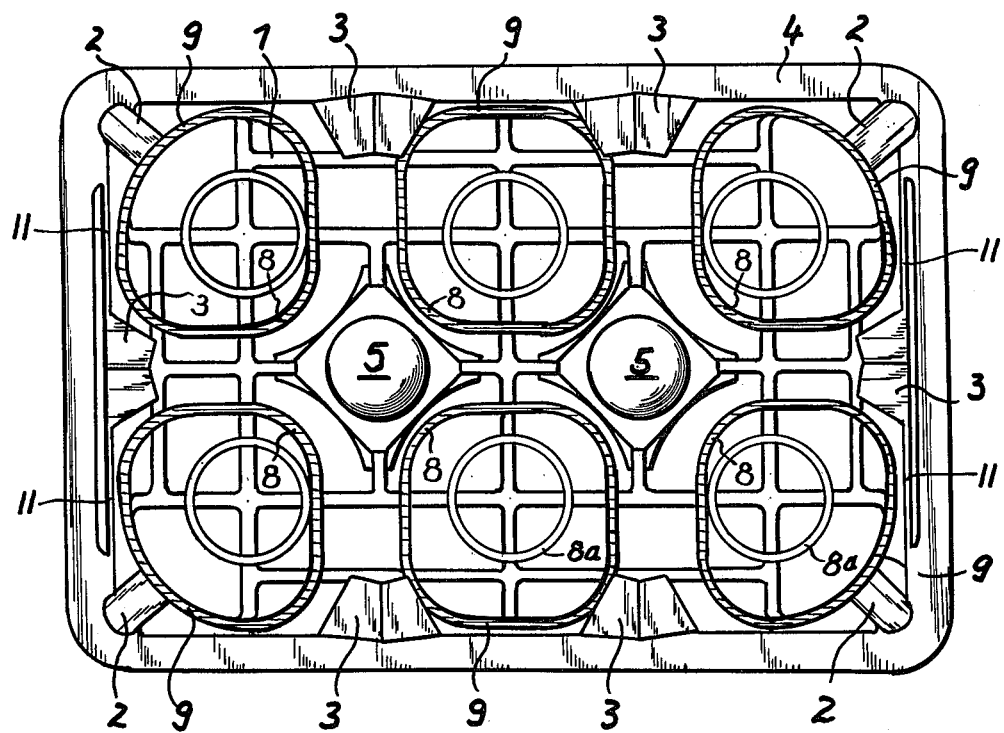
FIG. 3 is a bottom plan view of the same carrier.
Figure 4:
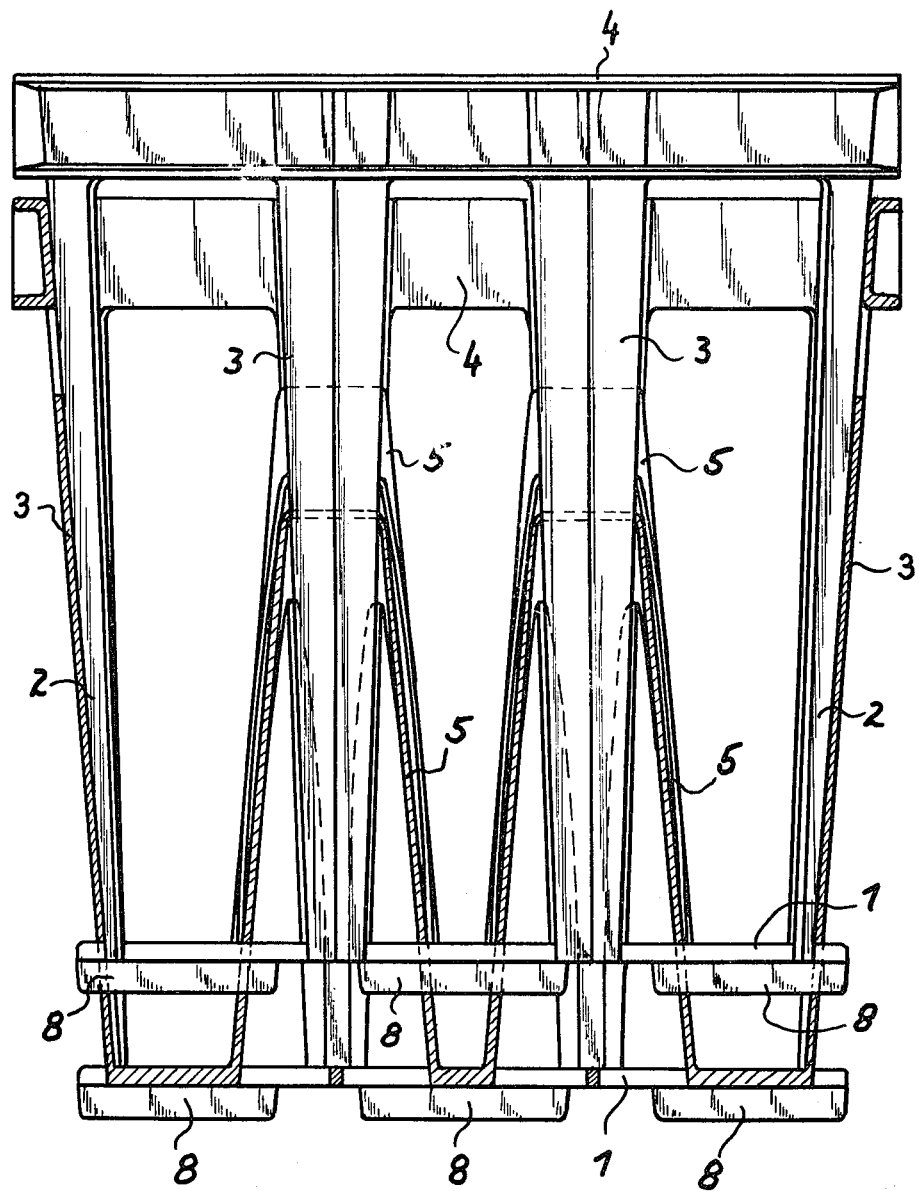
FIG. 4 is an elevational view showing two of the carriers, one nested within the other, with the lower carrier being shown in cross section.

Each dome 5 is provided with cutouts 10 in its sides, these cutouts conforming in outline, as can be seen in FIG. 2, to the bottles to be carried.

All of the columns 2 and 3 are formed to have a trough-shaped, or V-shaped, cross section, with the trough, or V-shaped opening toward the middle of the carrier.

As shown in FIG. 1 the tops of the bottles 7 which are inserted in the projections 8 lean against the grid-like bottom 1. So it is not possible to shove the tops of bottles 7 through that grid-like bottom 1. It is possible for the carriers to initially have the same interior height as the bottles and to become slightly compressed, when filled carriers are stacked upon one another, to enable the weight load of the stack to be supported by the bottles.

As shown in FIG. 3 each of the stacking projections 8 may be provided with a curved container guide 8a having a radius of curvature coaxial with the vertical central axis of its associated compartment.

Further a bar 11 of material may extend across each short side of each carrier to provide an opening for insertion of a hand. The corresponding columns 3 are then connected, at their ends, with the bottom 1 and with the bar 11.

It will be understood that the above description of the present invention is susceptible to various modifications, changes and adaptations, and the same are intended to be comprehended within the meaning and range of equivalents of the appended claims.

What is claimed is:

1. In a stackable carrier for fluid containers, which carrier is of plastic and includes a bottom having a rectangular form and composed of a plurality of ribs defining a rectilinear open grid whose borders coincide with borders of the rectangle defining the bottom, a top frame defined by a closed strip of predetermined thickness in a horizontal direction, the frame defining the upper end of the carrier, a plurality of columns extending between, and connecting, the bottom and the top frame, a plurality of stacking projections extending downwardly from the bottom, and means for dividing the interior of the carrier into a plurality of compartments each for holding a respective container in an upright position, the external height of the carrier being greater than that of the containers which it is to hold, the improvement wherein:

there is a respective one of said stacking projections associated with each of said compartments;

each of said stacking projections includes a part which projects laterally beyond the borders of the rectangle defining said bottom to present a surface for supporting a bottle whose lower portion extends laterally beyond the borders of such rectangle;

each of said stacking projections is dimensioned and positioned for causing the minimum distance between each said projection and a vertical plane passing through the outer edge of said top frame to be at least equal to the predetermined thickness of said closed strip defining said frame, and for causing the minimum distance between each adjacent pair of stacking projections to be at least twice said predetermined thickness;

at least first ones of said columns are located between said laterally projecting parts of respective adjacent pairs of said stacking projections and are connected to ribs at the borders of said open grid so that the locations of the connections of said first ones of said columns to said ribs are located on the sides of the rectangle defining said bottom;

second ones of said columns extend from said stacking projections at the corners of said carrier and merge into said frame; and said means for dividing the interior of the carrier comprise hollow dome-shaped members located to define compartment boundaries, said members extending upwardly from said bottom, being upwardly tapered, and having a constant wall thickness, along their entire length.

2. An arrangement as defined in claim 1 wherein the interior height of said carrier, measured vertically from the upper surface of said bottom to the upper surface of said top frame, is less than the height of the containers which said carrier is to hold, whereby when a plurality of said carriers are filled with such containers and are stacked atop one another, the weight load of the resulting stack is supported by the containers.

3. An arrangement as defined in claim 2 wherein each of said stacking projections has the form of a closed, ring-shaped rib.

4. A plurality of carriers as defined in claim 2 and a plurality of fluid containers which said carriers are intended to hold said containers filling said carriers and said carriers being stacked together.

5. An arrangement as defined in claim 1 wherein at least some of said columns have a cross section in the form of a trough opening toward the center of said carrier.

6. An arrangement as defined in claim 1 wherein each of said stacking projections is provided with a curved container guide having a radius of curvature coaxial with the vertical central axis of its associated compartment.

7. An arrangement as defined in claim 4 wherein said carriers, filled with containers, are stacked in a plurality of levels in a manner such that the carriers at one level are staggered with respect to the carriers at the next level, with adjoining top frame sides of two horizontally adjacent carriers on one level being located between two adjacent stacking projections of a carrier at the next higher level.

* * * * *